J. S. PALMER.

Shoe Exhibitor.

No. 9,691. Reissued May 3, 1881.

*Witnesses;*

*Walter Fowler,*

*F. M. Smith Jr.*

*Inventor;*

*John S. Palmer*

*By Atty.*

*Wm. C. R. W. Fritze*

N. PETERS, Photo-Lithographer, Washington, D. C.

UNITED STATES PATENT OFFICE.

JOHN S. PALMER, OF MYSTIC BRIDGE, CONNECTICUT.

SHOE-EXHIBITOR.

SPECIFICATION forming part of Reissued Letters Patent No. 9,691, dated May 3, 1881.

Original No. 196,037, dated October 9, 1877. Application for reissue filed March 15, 1881.

*To all whom it may concern:*

Be it known that I, JOHN S. PALMER, of Mystic Bridge, in the county of New London and State of Connecticut, have invented a new and useful Improvement in Box-Knobs and Shoe-Holders; and I do hereby declare that the following is a full, clear, and exact description of the construction and operation of the same, reference being had to the accompanying drawings, making part of this specification, and to the letters of reference marked thereon.

The object of my invention is to provide a simple and cheap attachment to boxes used for containing shoes in stores, which shall serve to hold an exhibit-shoe on the outside of the box, and also serve the purpose of a knob or hook, by means of which the box to which it is attached may be removed from the shelf; and with these ends in view my invention consists of a spring-clamp adapted to be secured to a box and to grasp and expose to view a sample shoe, and having one end of the spring lever or jaw fashioned into a knob or hook, by means of which the box may be removed from the shelf, as will be hereinafter explained.

My invention further consists in the particular construction and arrangement of the fixed and movable jaws and the actuating-spring, as will be hereinafter and in detail explained.

In order that those skilled may know how to make and use my improved device, I will describe its construction and mode of operation, referring by letters to the accompanying drawings, in which—

Figure 1:
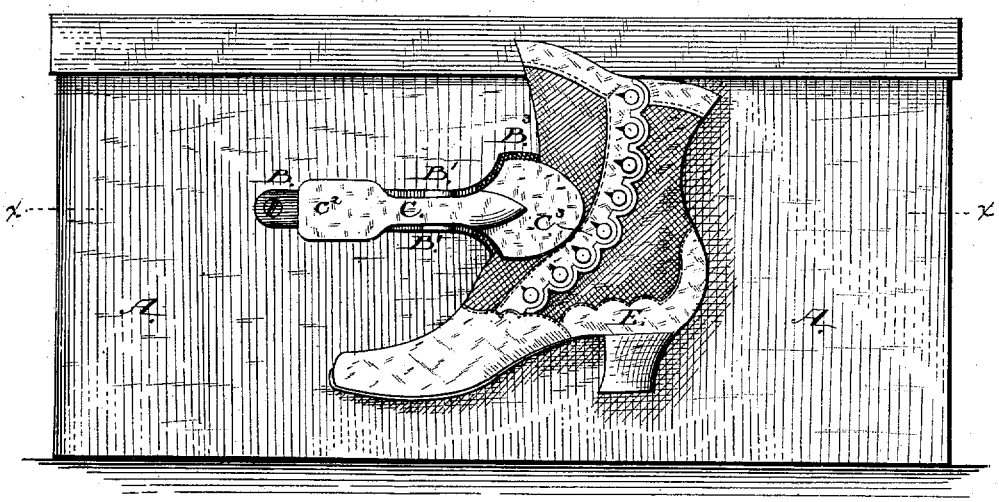
Figure 2:
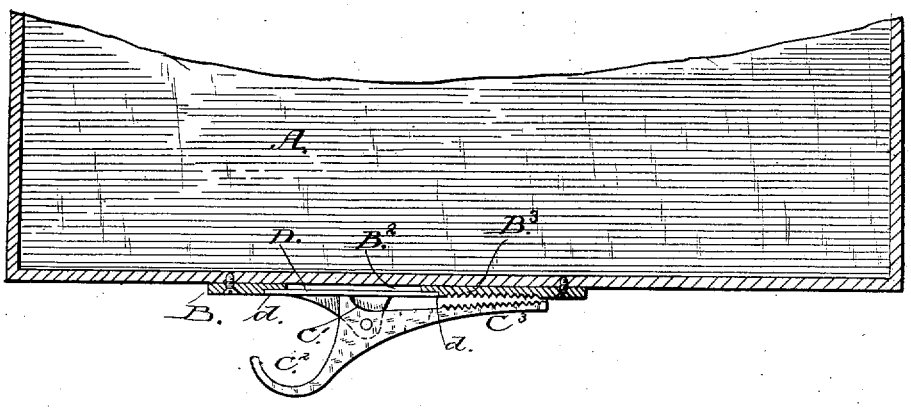

Figure 1 represents a front view of a shoe-box with my improved box-knob and shoe-holder in place and grasping for exhibition a shoe; and Fig. 2 is a horizontal section at the line *x x*, Fig. 1, with the shoe removed.

Similar letters indicate like parts in both figures of the drawings.

A designates an ordinary box for containing shoes.

B is the fastening-plate of my holder. This plate is provided with two projecting ears or lugs, B′ B′, between which is pivoted a movable or vibrating piece, C, having formed on its under side a lug, C′, which rests against a flat spring, D, set into a recess in the outer side of the plate B. This plate B is formed with a longitudinal opening, $B^2$, under the flat spring D, so as to allow room for the flexure of the same caused by the lug C′ pressing against the middle of the spring when the vibrating piece C is rocked upon its pivot in the ears or lugs B′. The object and effect of the spring D is obviously to cause the end $C^3$ of the piece C to approach the end $B^3$ of the stationary plate B, said portions $C^3$ $B^3$ being roughened, as shown, to facilitate the holding of the shoe E, as shown at Fig. 1. The end $C^2$ of the vibrating piece C is fashioned into a knob or hook, as clearly shown, so that it may be employed as a means for removing the box from the store-shelf, thus dispensing with any other or auxiliary device for this purpose. The grasping hook or knob, it will be observed, is to one side of the pivot; hence any strain exerted in removing the box from the shelf will tend to more securely hold the shoe.

My improved box-knob and shoe-holder is secured to the shoe-box by suitable screws or rivets, as clearly shown in the drawings, and in exhibiting slippers they are preferably grasped by the holder at one side, near the point where the arch which sets over the instep begins, as this is the best point to insure a more perfect balance of the slipper.

It will be observed that the flat spring D, which bears against the lug C′ on the upper jaw, C, is so arranged that no obstruction whatever is offered to the insertion of the fingers behind the hook end $C^2$.

I am aware that devices for displaying shoes provided with a fixed and a movable spring-jaw have heretofore been employed; but I am not aware that any have heretofore been made involving the peculiarities of construction shown in my device, and having the movable jaw so fashioned that it shall subserve the purpose of a knob or handle, by means of which the box to which it is attached may be removed from the shelf.

I do not wish to claim, broadly, a spring device for exhibiting shoes; but

What I do claim, and desire to secure by Letters Patent, is—

1. A spring-clamp designed to be secured to a shoe-box and grasp for exhibition a shoe, and having a knob or hook, by means of which the box may be removed from the shelf, substantially as hereinbefore set forth.

2. The fixed jaw B, provided with the longitudinal opening $B^2$, recessed at its ends to receive the flat spring D, in combination with the movable jaw C, provided with the lug C′ and curved handle $C^2$, the whole adapted to be secured to a shoe-box, substantially as described, and for the purpose set forth.

In testimony whereof I have hereunto set my hand and seal this 10th day of March, 1881.

JOHN S. PALMER. [L. S.]

In presence of—
F. W. SMITH, Jr.,
WM. C. MCINTIRE.